United States Patent [19]

Van Paesschen et al.

[11] 4,132,552
[45] Jan. 2, 1979

[54] DIMENSIONALLY STABLE POLYESTER FILM SUPPORTS WITH SUBBING LAYER THEREON

[75] Inventors: August J. Van Paesschen, Antwerp; Lucien J. Van Gossum, Kontich; Jan J. Priem, Mortsel, all of Belgium

[73] Assignee: AGFA-GEVAERT N.V., Mortsel, Belgium

[21] Appl. No.: 738,487

[22] Filed: Nov. 3, 1976

[30] Foreign Application Priority Data

Nov. 7, 1975 [GB] United Kingdom .............. 46200/75

[51] Int. Cl.² .......................... G03C 1/78; G03C 1/96
[52] U.S. Cl. .................... 96/87 R; 96/84 R; 96/87 A; 427/129; 427/131; 427/171; 427/172; 428/483; 428/484
[58] Field of Search ............... 96/87 A, 87 R, 84 R; 427/129, 131, 171, 172; 428/482, 484

[56] References Cited

U.S. PATENT DOCUMENTS

| | | | |
|---|---|---|---|
| 3,460,982 | 8/1969 | Appelbaum | 96/87 R |
| 3,615,561 | 10/1971 | Dolce et al. | 96/87 R |
| 3,751,280 | 8/1973 | Nerurkar et al. | 96/87 R |
| 3,788,856 | 1/1974 | Van Paesschen et al. | 96/87 R |
| 3,911,172 | 10/1975 | Van Paesschen et al. | 96/87 R |
| 3,988,157 | 10/1976 | Van Paesschen et al. | 96/87 R |
| 4,001,023 | 1/1977 | Van Paesschen et al. | 96/87 R |
| 4,048,357 | 9/1977 | Van Paesschen et al. | 96/87 R |

Primary Examiner—Jack P. Brammer
Attorney, Agent, or Firm—William J. Daniel

[57] ABSTRACT

A process is described for the manufacture of a dimensionally stable polyester film support carrying a primer coating for improving the adhesion thereto of subsequently applied coatings, which process comprises applying to an unstretched or only monoaxially stretched polyester film support a layer of a coating composition from an aqueous dispersion, drying said layer, stretching it biaxially or in a direction perpendicular to the said first stretching operation together with the polyester film support and heat-setting the polyester film, wherein said coating composition, before drying and heat-setting, comprises a mixture of:

(A) 52 to 79% by weight of a copolymeric binder comprising 60 to 95% by weight of methyl methacrylate, 3 to 20% by weight of a divinyl or diallyl monomer, 0 to 30% by weight of a plasticizing vinyl monomer, and 0 to 5% by weight of an ethylenically unsaturated carboxylic acid, (B) 0.5 to 3% by weight of a water-insoluble wax-like material and/or of a water-insoluble polymer characterized by the presence of repeating units corresponding to the formula:

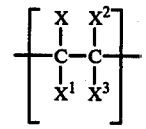

wherein each of X, $X^1$, $X^2$, and $X^3$ represents hydrogen or fluorine, or each of X, $X^1$, and $X^2$ represents hydrogen and $X^3$ represents a methyl group, or X represents chlorine and each of $X^1$, $X^2$, and $X^3$ represents fluorine, (C) 20 to 40% by weight of an external plasticizer, said external plasticizer being wholly or almost entirely eliminated from the coating composition during the heat-setting, and (D) 0 to 5% by weight of a hydrophilic polymer.

21 Claims, No Drawings

DIMENSIONALLY STABLE POLYESTER FILM SUPPORTS WITH SUBBING LAYER THEREON

The invention relates to the manufacture of a dimensionally stable polyester film support carrying a primer layer for improving the adhesion thereto of subsequently applied coatings. More especially the invention relates to the manufacture of motion picture film materials having applied thereto magnetic recording stripes, particularly motion picture film materials wherein the film support is a film of high molecular weight linear polyester, more especially a film of polyethylene terephthalate.

Magnetic recording stripes are applied preferably to the rear side of the motion picture film support, the front side of the support being provided with a light-sensitive emulsion layer or layers.

The magnetic recording stripes are applied to motion picture film before exposure to light and before processing; or the magnetic recording stripes ae applied to exposed and processed motion picture films. In the first case, the magnetic recording stripe is normally applied onto an alkalisoluble backing layer such as an anti-halation layer or an antistatic layer, which is present on the rear side of the film support. These backing layers are removable in the processing baths. More especially, an anti-halation layer is formed of an alkali-soluble binder and a dye or pigment, usually carbon black, intended to provide antihalation protection and to shield the film from light when it is placed in the camera or removed therefrom in daylight. The backing layer is designed in such a way that it can be removed in alkaline solutions or in an alkaline solution followed by a water rinse, in those areas not covered by the stripe(s). In the second case, the magnetic recording stripes are applied to motion picture films after exposure to light and after processing in the photographic baths. In this case, the antihalation layer or antistatic layer has already been eliminated from the rear side of the film so that the magnetic recording stripe is directly applied to the primer layer, which adheres to the polyester film support and which is destined to firmly attach the backing layer and/or the magnetic recording stripe to the polyester film support.

In both the above cases, large parts of the primer layer will remain uncovered in the final product bearing the magentic recording stripe(s). Accordingly, the following properties are desirable for a primer layer, namely:

1. the layer should ensure a good adhesion of the magnetic recording stripe or underlying backing layer portions to the polyester film support.
2. it should have a scratch resistance at least of the same magnitude as that of untreated polyester film.
3. it should withstand a treatment with solvents for at least 15 seconds without showing any visible alteration.
4. it must be photographically inert.
5. when the processed motion picture film material is wound up in a roll so that the primer layer is directly in contact with the emulsion layer of an adjacent turn, the primer layer and the emulsion layer have to remain unaltered during storage of the motion picture film material at temperatures of up to 60° C. and at high relative humidities.

According to the present invention, a process is provided for the manufacture of a dimensionally stable polyester film support having a primer coating for improving the adhesion thereto of subsequently applied coatings, which process comprises applying to an unstretched or only monoaxially stretched polyester film support a layer of a coating composition from an aqueous dispersion, drying said layer, stretching it biaxially or in a direction perpendicular to the said first stretching operation (if any), together with the polyester film support, and heat-setting the polyester film, said coating layer composition, before drying and heat-setting, comprising a mixture of:

(A) 52 to 79% by weight of a copolymeric binder comprising 60 to b 95% by weight of methyl methacrylate, 0 to 30% by weight of a plasticizing monomer, 3 to 20% by weight of a divinyl or diallyl monomer, and 0 to 5% by weight of an unsaturated carboxylic acid,
(B) 0.5 to 3% by weight of a water-insoluble wax-like material and/or of a polymer characterized by the presence of repeating units corresponding to the formula

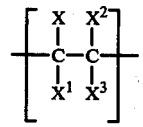

wherein each of X, $X^1$, $X^2$, and $X^3$ represents hydrogen or fluorine, or
each of X, $X^1$, and $X^2$ represents hydrogen and $X^3$ represents a methyl group,
or X represents chlorine and each of $X^1$, $X^2$, and $X^3$ represents fluorine,
(C) 0 to 5% by weight of a hydrophilic polymer, and
(D) 20 to 40% by weight of an external plasticizer.

During heat-setting the external plasticizer is almost entirely eliminated from the coating composition.

It is evident that upon elimination of the external plasticizer from the coating composition of the primer layer during the heat-setting operation, the relative percentages by weight of the ingredients in the dried primer layer will be different. Indeed, for a coating composition comprising 52 to 79% by weight of copolymeric binder, 0.5 to 3% by weight of a water-insoluble wax-like material and/or of a polymer of the specified structure, 0 to 5% by weight of hydrophilic polymer and 20 to 40% by weight of an external plasticizer, the dried primer layer after the heat-setting operation (and removal of the plasticizer) will be composed as follows: 86 to 99% by weight of copolymeric binder, 0.6 to 5% by weight of wax-like material and/or of a polymer of the specified structure and 0 to 9% by weight of hydrophilic polymer.

The invention therefore also comprises a dimensionally stable polyester film support provided with a primer layer strongly adhering to the film support as defined hereinafter, comprising a mixture of:

(A) 86 to 99% by weight of a copolymeric binder comprising 60 to 95% by the reference to weight of methylmethacrylate, 0 to 30% by weight of a plasticizing monomer, 3 to 20% by weight of a divinyl or diallyl monomer, and 0 to 5% by weight of an unsaturated carboxylic acid;
(B) 0.6 to 5% by weight of a water-insoluble wax-like material and/or of a polymer characterized by the presence of repeating units corresponding to the formula:

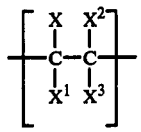

wherein X, $X^1$, $X^2$ and $X^3$ have the same significances as indicated above.

By the reference to a primer layer strongly adhering to the film support is meant that when a pressure sensitive adhesive tape is pressed onto the primer layer and then torn off at an actue angle, the primer layer should be left undamaged, even if the primer layer is previously scratched several times with a knife to facilitate the tearing off.

In a method of forming a dimensionally stable polyester film e.g. of polyethylene terephthalate, the polyester is extruded in the melt and quenched immediately on a cooling cylinder to form an amorphous film. This amorphous film is then stretched longitudinally and transversely, i.e. first longitudinally and then transversely, or first transversely and then longitudinally, or in but a single operation, i.e. biaxially, the stretching being performed at 80 to 90° C. to form a crystalline film having its dimensions increased by 3 to 5 times. Subsequently, the film is heat-set at about 220° C. for a few seconds while being kept under tension in both directions.

The primer layer is one which has been formed by applying to the film a coating composition, and then subjecting the film to at least one stretching operation and heat-setting it. In certain embodiments, the coating composition is applied to the film before any stretching or after monoaxial stretching thereof and at a stage after such application of coating composition the film is stretched biaxially or only in a direction perpendicular to the aforesaid monoaxial stretching (if performed).

A layer applied to the polyester film before a stretching operation should meet two special requirements:
1. in unstretched condition and consequently when it is thicker, e.g. 3 to 5 times thicker than after having been stretched, the layer should possess sufficient adhesion to the polyester film and sufficient hardness so as not to be damaged easily during the stretching operation.
2. the layer should have a softening temperature lower than the temperature at which stretching occurs, which is generally from 80 to 90° C., so that it can be stretched to a homogeneous layer without the appearance of microscopic cracks.

The main problem is that the glass transition temperature (Tg) or the softening temperature of the polymeric binder chosen must be as high as possible in order that the motion picture material can withstand thermic storage conditions occurring in practice. For instance a processed cine film should be able to resist the heat in a car standing in direct sunshine on a hot summerday. Yet the choice of the high Tg of the polymer is restricted in two ways:
1. as the Tg of the polymer increases, the aptitude to layer formation of an aqueous dispersion of the polymer decreases.
2. as the Tg increases, the stretchability at 80–90° C. of a layer formed from the polymer decreases also, 80–90° C. being the normal temperature range used for stretching films of polyethylene terephthalate.

Thus a high Tg is needed to ensure that the motion picture film can withstand practical thermic storage conditions. At the same time, the Tg is to be kept low to improve the aptitude to layer formation and to stretchability of layers made from the polymer.

Notwithstanding the above, a polymer possessing a high Tg can effectively be used if this polymer is mixed with an external or temporary plasticizer, i.e. a plasticizr which by its mere presence improves the layer formation and the stretchability of this layer as a result of its softening characteristics. It is a temporary plasticizer since it will for the greater part and preferably completely or almost completely cease to be present as such, probably due to sublimation, during the heat-setting of the film, which heat-setting usually occurs at approximately 220° C. This will be discussed further hereinafter.

The copolymer constituent A used in the invention essentially consists of methyl methacrylate because this monomer yields a scratch-resistant, tough polymer layer.

In order to make the layer resistant to solvents e.g. those used for the cleaning of soiled cine film, for which purpose methyl chloroform is often used, or those solvents used for contact printing of cine film in an immersion liquid, for which perchloroethylene happens to be in common use, the copolymeric binder is insolubilised by building in 3 to 20% by weight of divinyl or diallyl monomers. Preferably ethylene dimethacrylate is used for this purpose, because the copolymerisation behaviour thereof with methyl methacrylate is almost ideal.

Other divinyl- or diallyl monomers can also be used if, depending on their different copolymerisation constants, sufficient monomer can be built in for cross-linking purposes. The following compounds are mentioned illustratively: divinyl benzene, ethylene diacrylate, diallyl phthalate and divinylsulphone.

It was found that favourable results concerning the adhesion to hydrophilic layers such as e.g. antihalation and antistatic layers are obtained by making the primer layer more hydrophilic. This is achieved by building in the copolymeric binder of the layer small amounts, e.g. up to 5% by weight of unsaturated carboxylic acids or derivatives thereof, such as acrylic acid, methacrylic acid, crotonic acid, maleic acid, fumaric acid, itaconic acid, the amides of acrylic and methacrylic acid, and mono-alkyl esters of maleic acid. The same results are obtained by mixing the copolymer with up to 5% by weight of hydrophilic polymers. Most favourable results are obtained with polyvinyl alcohol, hydroxyethyl cellulose and related compounds, gelatin and polyvinyl pyrrolidone.

To improve the layer forming properties and the stretchability of the copolymeric binders plasticizing monomers can be built in during copolymerisation. The decreasing softening temperature, resulting in an improved layer forming ability, then depends on the content and the composition of plasticizing monomers.

Preference is given to plasticizing monomers such as the lower alkyl esters of acrylic acid or methacrylic acid. However, monomers such as e.g. alkyl maleates, butadiene, vinyl alkyl ethers, vinyl acetate, vinyl propionate and vinylidene chloride can be used too. Normally the content of plasticizing monomer in the copolymer may vary between 0 and 30% by weight.

Suitable copolymers for forming the polymeric binder in the primer coating are:
co(methyl methacrylate/ethylene dimethacrylate) (90:10%)

co(methyl methacrylate/ethylene dimethacrylate/methacrylic acid) (85:10:5%)
co(methyl methacrylate/ethylene dimethacrylate/ethyl acrylate) (70:10:20%)
co(methyl methacrylate/ethylene dimethacrylate/n-butyl acrylate) (80:10:10%)
co(methyl methacrylate/ethylene dimethacrylate/n-butyl acrylate/itaconic acid) (77:10:10:3%)
co(methyl methacrylate/ethylene dimethacrylate/n-butyl acrylate/vinylidene chloride) (60:10:10:20%)
co(methyl methacrylate/ethylene dimethacrylate/n-butyl methacrylate) (65:5:30%)
co(methyl methacrylate/ethylene dimethacrylate/t-butyl acrylamide) (80:10:10%)
co(methyl methacrylate/ethylene dimethacrylate/diacetonacrylamide) (75:10:15%)
co(methyl methacrylate/ethylene dimethacrylate/acrylonitrile) (75:10:15%)
co(methyl methacrylate/ethylene dimethacrylate/vinylidene chloride) (80:10:10%)
co(methyl methacrylate/ethylene dimethacrylate/butadiene) (80:10:10%)

In the above enumeration the numbers between brackets are the ratios by weight of the different monomers present in the copolymers.

As already mentioned, to improve the layer formation and the stretchability of the copolymeric binders external or temporary plasticizers are used in order not to lower the softening temperature of the layer composition too much. In order that the softening temperature of the stretched layer be as high as possible, a compromise must be found between the maximum softening temperature of the binder, to be adjusted by copolymerisation with a plasticizing monomer on the one hand and on the other hand the use of a minimum amount of external plasticizer such e.g. as to avoid making the layer sticky. In order not adversely to influence the final quality of the stretched layer, preferably an external plasticizer is used in an amount between 20 and 40% by weight based on the weight of the primer layer coating composition, this external plasticizer being present during the coating, drying, and stretching of the layer, but for the greater part or wholly disappearing from the layer during the heat-setting, probably by sublimation.

Accordingly, by adding external plasticizers to the coating composition for the primer layer, there is a difference between the coating composition as it is applied before final stretching and heat-setting and the composition of the primer layer in the final motion picture film material. In the process according to the invention as above defined, before heat-setting, between 20 and 40% by weight of an external plasticizer are present, whereas in the final motion picture film material at least the greater part and preferably the whole or almost the whole of the external plasticizer will no longer be present as such, as above explained.

Suitable examples of such external plasticizers are resorcinol and homologous dihydroxybenzenes, aliphatic polyhydroxy compounds, e.g., glycerol, tri($\beta$-hydroxyethyl)glycerol, 1,1,1-tri(hydroxymethyl)propane, 2-nitro-2-ethyl-1,3-propanediol, 1,3-dichloro-2-propanol, 1,2,4-butanetriol, 3-hydroxymethyl-2,4-dihydroxypentane, 1,2,6-hexanetriol, 2-hydroxymethyl-4-hydroxy-amyl alcohol, glycerol-aldehyde and mannitol.

Equally suitable are caprolactam, N,N'-dimethylurea, and aliphatic or sulphonic acids, e.g., malonic acid, glutaric acid, adipic acid, azelaic acid, sebacic acid, mono- and dichloroacetic acid, 1,2,3-propene tricarboxylic acid, acrylic acid, methacrylic acid, maleic acid, fumaric acid, itaconic acid, and 2-sulpho-ethyl methacrylate; aromatic acids such as phthalic acid, o-sulphobenzoic acid, o-nitrobenzoic acid, o-aminobenzoic acid, p-hydroxybenzoic acid, and salicyclic acid.

The coating composition for the primer layer also comprises 0.5 to 3% by weight of a wax-like material and/or of some water-insoluble polymers. All water-insoluble thermoplastic wax-like materials of the known classes of waxes i.e. vegetable waxes, insect waxes, animal waxes, mineral waxes, petroleum waxes and synthetic waxes, as well as the water-insoluble wax-like components that occur individually in said waxes, more particularly long-chain hydrocarbons, fatty saturated and unbranched acids and alcohols, as well as the ethers and esters of substantially aliphatic monohydric alcohols, can be used for the purpose of the invention.

The petroleum waxes are compositions mainly consisting of a mixture of long-chain hydrocarbons, whereas the vegetable, animal, insect, and mineral waxes usually are compositions made up largely of esters formed in nature by the union of higher alcohols with the higher fatty acids, e.g. carnauba wax, wool wax, and montan wax.

Associated with these esters are one or more of the following components, which vary greatly in amount in accordance with the source of the wax: free saturated and unbranched fatty acids and monohydric alcohols, and long-chain hydrocarbons, to mention the most important.

In general, the wax-like materials used according to the invention are preferably meltable, thermoplastic materials that are dispersible in water and lower the friction coefficient of the layer wherein they are present. They differ from related natural and synthetic products such as oils, fats, gums and resins i.a. in that they are converted from the solid into the liquid state at temperatures generally comprised between 20 and 100° C. (in some extraordinary cases up to 200° C., which applies particularly to some synthetic waxes) and that they have a low melt viscosity.

Aqueous dispersions of polymers characterized by the presence of repeating units according to the following general formula can also be added to increase the scratch resistance of the layer:

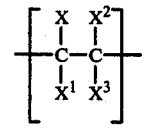

wherein X, $X^1$, $X^2$, and $X^3$ have the same significances as indicated above.

Suitable are aqueous dispersions of water-insoluble polymers such as polyethylene, polypropylene, polytetrafluoroethylene, and polytrifluorochloroethylene.

The improvement of the scratch resistance brought about by the incorporation of these aqueous dispersions into the primer layer manifests itself very clearly in the testing method for which the American Standard Method for determining the scratch resistance of processes photographic film pH 1.37 — 1963 is used. According to this method the abrasion resistance is determined by drawing at 20° C. a spherical sapphire needle of 0.076 mm radius over the primer layer while charging the needle with an increasing weight. The abrasion resistance is the lowest weight at which the sapphire needle leaves a visible scratch on the layer. This method is especially interesting for comparing the scratch resistance of the material of the invention with that of an untreated polyester film support.

The sound track compositions, that show the best adhesion during coating on the primer layer according to the invention are of known type and do not constitute on essential feature of the invention. Yet, they have to be adapted to the purpose for which they are intended.

Indeed, as described hereinbefore, the sound track can be applied to a motion picture film material that has already been exposed and processed. In that case the antihalation layer or antistatic layer that is usually applied at the rear side of the motion picture film material will have disappeared in the processing baths and the sound track is applied directly to the bared primer layer. A small ribbon of, e.g., cellulose triacetate carrying a layer of magnetic recording material may be adhered to the bared primer layer by means of known adhesives, or small stripes of magnetic recording paste may be coated in known manner to the primer layer.

However, if the sound track is applied already during the manufacture of the motion picture film material, the sound track is coated on top of the antihalation layer. Due to the solubility in alkali of the binder, this layer is removable in alkaline solutions. In such a film it is obviously impractical to merely apply the magnetic recording stripe to the removable backing layer, since such layer will loosen partially or wholly from the support in the presence of an alkaline solution such as a developer, so that the magnetic recording stripe will be destroyed or damaged. So, it is necessary in this case to adapt the composition of the sound track by the addition thereto of bis- or polyfunctional compounds that can enter into reaction with the free acid groups of the binder of the antihalation layer and thus accomplish cross-linking and insolubilisation of the antihalation layer under the magnetic recording stripe.

These bis- or polyfunctional compounds comprise at least two reactive groups such as aziridine groups, epoxide groups, aldehyde groups, acryloyl or methacryloyl groups, groups containing reactive halogen atoms, e.g. $-CH_2Cl$ and sulphofluoride groups, and soluble metal complexes as described in our Belgian Pat. No. 778,160 filed Jan. 18, 1972 by the Applicant. Compounds comprising at least two isocyanate groups as described in our Belgian Pat No. 810,884 filed Feb. 12, 1974 by the Applicant, or carbodiimides as described in our Belgian Pat. No. 814,373 filed Apr. 30, 1974 by the Applicant, or some bis- or polyepoxides in combination with at least one sulphoxide and/or with formamide, as described in our Belgian Pat. No. 828,663 filed May 2, 1975 by the Applicant are also suitable. After normal processing of the motion picture film material, the antihalation layer appeared to be removed except under the magnetic recording stripe.

It is obvious that the amount of cross-linking agent present in the magnetic recording stripe has to be adapted to the chemical composition of the binder of the antihalation layer.

The adhesion of the magnetic recording stripe directly to the primer layer, or when an antihalation layer is present, to the antihalation layer, can easily be checked. When a pressure sensitive adhesive tape is pressed to the stripe and then torn off at an acute angle, the stripe should be left undamaged, even after the material had been scratched several times with a knife to facilitate the tearing off.

In general not only a magnetic recording stripe or sound track is applied to the motion picture film material but also a narrow balance stripe to the edge of the film opposite to that of the sound track, this balance stripe having the same composition to facilitate rolling up of the motion picture film. Of course, the data given about the composition of the sound track also apply to the composition of the balance stripe.

The primer layer coating composition may be applied to the polyester film support in a manner known in the art and in such a concentration as to yield after the stretching a primer layer having a thickness when dried between 0.1 and 1.0 $\mu$m, preferably between 0.3 and 0.6 $\mu$m.

The examples hereinafter are especially directed to the use of polyethylene terephthalate film as support for the motion picture film material. The primer layer composition can, however, be applied also to other polyester films, e.g. films of polyesters resulting from the polycondensation of glycol, or mixtures of glycols with terephthalic acid, or mixtures of terephthalic acid with minor amounts of other dicarboxylic acids such as isophthalic acid, diphenic acid, and sebacic acid.

The invention is illustrated by the following examples.

EXAMPLE 1

A substantially amorphous polyethylene terephthalate film having a thickness of approximately 1.2 mm was formed by extrusion of molten polyethylene terephthalate at about 280° C. on a quench drum and was chilled to about 75° C. The film was then stretched in the longitudinal direction over a differential speed roll stretching device to 3.5 times its initial dimension at a temperature of 84° C.

The following primer layer composition was applied to the thus stretched film at a ratio of 70 sq.m/l.

| | |
|---|---|
| 20% aqueous dispersion of co(methyl methacrylate/ethylene dimethacrylate/butadiene) (80:10 : 10 % by weight) | 500 ml |
| resorcinol | 35 g |
| 10% aqueous dispersion of polytetrafluoroethylene | 5 ml |
| 10% aqueous solution of ULTRAVON W (trade name) | 5 ml |
| water | 470 ml |

ULTRAVON W is the trade name of CIBA A.G., Switzerland, for a dispersing agent consisting of the disodium salt of heptadecylbenzimidazole disulphonic acid.

The layer was dried in a hot airstream, whereupon the film was stretched transversely in a tenter frame to 3.5 times its original width at a temperature of about 80° C. The film was then conducted into an extension of the tenter frame, where it was heat-set while being kept under tension at a temperature of 200° C. for about 10 seconds.

When the Tg of the primer layer was measured by constant flow thermal analysis (CFTA) (see E. Steffens, J. Appl. Pol. Sci., (1968) 12, 2317-2324), there was found a transition phase at about 140° C. which was attributable to the glass transition temperature (Tg).

The clear, transparent primer layer resisted dipping for 15 seconds in solvents such as methanol, ethanol, perchloroethylene, methylchloroform, methylgycol, butanone, dichloroethane and acetone. When two samples of the polyethylene terephthalate film covered with the primer layer were pressed together in a press at 10.000 kg/sq.cm and at a temperature of 120° C., the primer layers facing each other, the two samples did not stick together and could easily be separated without visible changes in the primer layers.

The scratch resistance of the primer layer, measured as indicated above, was about 60 g, which is comparable to the scratch resistance of untreated polyethylene terephthalate film, measured under the same conditions.

The primer layer was covered with a magnetic recording stripe and a balance stripe from the following coating composition:

| magnetic iron oxide | 213 g |
|---|---|
| co(vinylchloride/vinyl acetate/vinyl alcohol) (91:3:6 % by weight) | 68 g |
| GAFAC RM 710 (trade name) | 4 g |
| oleic acid | 14 g |
| n-butyl acetate | 600 ml |
| ethyl acetate | 400 ml |
| dimethyl sulphoxide | 50 ml |

GAFAC RM 710 is the trade name for a coating aid sold by General Aniline and Film Corporation, U.S.A., composed of a mixture of organic phosphates corresponding to the formulae:

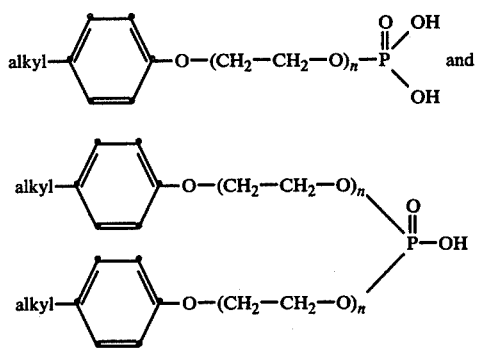

The adhesion of the magnetic recording stripe and of the balance stripe was excellent. When both stripes were applied directly to a polyethylene terephthalate film that had not been covered with the primer layer, they could easily be torn away in the pressure-sensitive adhesive tape test described above.

The results were identical, when light-sensitive emulsion layers as normally present in motion picture film material had been applied to the other side of the polyethylene terephthalate film support.

EXAMPLE 2

A polyethylene terephthalate film that had been stretched longitudinally as described in example 1, was covered with a primer layer from the following composition:

| 20% aqueous dispersion of co(methyl methacrylate/ethylene dimethacrylate/vinylidene chloride) (60:10 : 30 % by weight) | 350 ml |
|---|---|
| maleic acid | 20 g |
| 20% aqueous dispersion of MOBILCER Q (trade name) | 10 ml |
| 10% aqueous solution of ULTRAVON W (trade name) | 5 ml |
| water | 625 ml. |

MOBILCER Q is the trade name of Mobil Oil Co, for a 50% aqueous paraffine dispersion.

The layer was dried, whereupon the film was stretched transversely at 80° C. to 3.5 times its original width. Subsequently, it was heat-set at 200° C. for a few seconds.

With CFTA the primer layer proved to possess a Tg of 120° C. Its scratch resistance was about 100 g. When heated and pressed in a press as indicated in Example 1, it showed no sticking below 120° C.

The primer layer was covered with a sound and a balance track from the following composition:

| magnetic iron oxide | 75 g |
|---|---|
| cellulose nitrate | 14 g |
| dioctyl phthalate | 8 g |
| VINSOL (trade name) | 2 g |
| methyl ethyl ketone | 900 ml |
| isopropanol | 100 ml |
| dimethyl sulphoxide | 50 ml |

VINSOL is the trade name of Hercules Powder Co., for a complex mixture of resinous components, including complex phenols, phenol ethers and polyphenols.

The adhesion of the magnetic recording sound stripe and of the balance stripe to the primer layer was excellent.

EXAMPLE 3

The process described in Example 1 was repeated, the coating composition for the primer layer being composed as follows:

| 20% aqueous dispersion of co(methyl methacrylate/ethylene dimethacrylate/n-butyl acrylate/ itaconic acid) (77:10:10:3 % by weight) | 400 ml |
|---|---|
| phthalic acid | 25 g |
| 10% aqueous solution of ULTRAVON W (trade name) | 5 ml |
| 10% aqueous dispersion of HOECHST WAXES (trade name) | 30 ml |
| water | 535 ml |
| 20% aqueous solution of hydroxyethyl cellulose | 10 ml |

The Tg of the primer layer showed to be 117° C. and its scratch resistance 110 g.

A magnetic recording stripe having the composition described in Example 1 adhered very well to the primer layer.

EXAMPLE 4

The process described in Example 1 was repeated, the coating composition for the primer layer being composed as follows:

| 20% aqueous dispersion of co(methyl methacrylte/ethylene dimethacrylate/methacrylic acid) (85:5:10 % by weight) | 250 ml |
|---|---|
| malonic acid | 20 g |
| 10% aqueous solution of ULTRAVON W (trade name) | 5 ml |
| 20% aqueous dispersion of polyethylene | 10 ml |
| low viscous polyvinyl alcohol | 2,5 g |
| water | 720 ml |

The scratch resistance of the primer layer was 65 g. When a magnetic recording composition as described in Example 2 was applied to this primer layer, the sound and balance stripes appeared to adhere very well to the polyester support, as was demonstrated according to the method of the pressure-sensitive adhesive tape described hereinbefore.

EXAMPLE 5

The front side of a longitudinally stretched polyethylene terephthalate film having a thickness of 0.35 mm was coated with an adhesive layer in a ratio of about 2 g/sq.m from an aqueous suspension containing:

| | |
|---|---|
| 20% latex of co(vinylidene chloride/ vinyl chloride/n-butyl acrylate/ itaconic acid) (30:50:18:2 % by weight) | 500 g |
| finely divided silica | 5 g |

The rear side of the polyester film was coated at a ratio of 70 sq.m/l with a primer layer from the following composition:

| | |
|---|---|
| 20% aqueous dispersion of co(methyl methacrylate/ethylene dimethacrylate/n-butyl acrylate (80:10:10% by weight) | 350 ml |
| resorcinol | 40 g |
| 20% aqueous solution of low viscosity polyvinyl alcohol | 10 ml |
| 40% aqueous dispersion of polyethylene | 5 ml |
| 10% aqueous solution of ULTRAVON W (trade name) | 5 ml |
| water | 600 ml. |

Subsequently, the film was stretched transversely to 3.5 times its original width at a temperature of 80° C. and heat-set while being kept under tension at 200° C. for about 10 seconds.

A subbing layer was then applied to the front side at 30 sq.m/l from the following composition:

| | |
|---|---|
| 10% aqueous solution of gelatin | 80 ml |
| 33% aqueous dispersion of amorphous silicon dioxide | 40 ml |
| caprolactam | 4 g |
| hexanetriol | 2 g |
| 10% aqueous solution of ULTRAVON W (trade name) | 6 ml |
| methanol | 100 ml |
| water | 770 ml. |

The rear side was coated with a carbon black antihalation layer at 20 sq.m/l consisting of:

| | |
|---|---|
| 20% aqueous dispersion of carbon black | 25 ml |
| 25% aqueous solution of co(methyl methacrylate/ethyl acrylate/ methacrylic acid) (60:10:30 % by weight) | 78 ml |
| 10% aqueous dispersion of MOBILCER Q (trade name) | 15 ml |
| 10% aqueous dispersion of polytetrafluoroethylene | 4 g |
| 10% aqueous solution of ULTRAVON W (trade name) | 7,5 ml |
| ammonium hydroxide 1.5 N | 25 ml |
| silicon dioxide having a particle diameter of 2-3 μm | 0,6 g |
| water | 835 ml |

After application to the front side of light-sensitive gelatin silver halide emulsion layers as known in positive-colour cinematography, the film was cut into the format of motion picture film. Subsequently, the carbon black antihalation layer was coated with a sound stripe and a balance stripe from the same composition as described in Example 1 to which, however, 9 g of N,N-bis(2,3-epoxypropyl)-butylamine had been added.

The motion picture film material was exposed in a camera and processed as usual, during which the antihalation layer was eliminated. Under the sound and balance stripes the antihalation layer remained intact and both stripes were excellently attached to the polyester film as could be demonstrated according to the pressure-sensitive adhesive tape test described above.

EXAMPLE 6

A polyethylene terephthalate film support was stretched longitudinally, provided with an adhesive layer and a primer layer as described in Example 5, stretched transversely and heat set while being kept under tension at 200° C. Finally, the adhesive layer was coated with a subbing layer as described in Example 5 too.

The rear side of the primer layer was covered with an antistatic layer at a ratio of 30 sq.m/l from the following composition:

| | |
|---|---|
| 10% aqueous soluton of the sodium salt of polystyrene sulphonic acid | 14 ml |
| resorcinol | 2.2 g |
| 40% aqueous dispersion of MOBILCER Q (trade name) | 1 ml |
| 10% solution in methanol of GAFAC RM 710 (trade name) | 0.4 ml |
| 10% solution in methanol of HEXAPON D (trade name) | 0.6 ml |
| diethylene glycol monomethyl ether | 5.5 ml |
| methanol | 490 ml |
| water | 490 ml. |

HEXAPON D is the trade name of Soc. Chimique Elbeuvienne for a dispersing agent of the formula

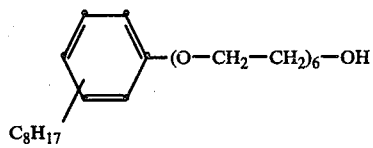

The antistatic layer has a surface resistance of $4.10^{10}$ ohm/sq at a relative humidity of 30% and a coefficient of friction of 0.2.

After application to the front side of light-sensitive emulsion layers as known in black-and-white cinematography, the film was cut into the format of motion picture film whereupon the antistatic layer was coated with a sound stripe and a balance stripe from the same composition as described in Example 1, to which, however, 9 g of N,N-bis(2,3-epoxypropyl)butylamine had been added.

The motion picture film was exposed in a camera and processed as usual, during which the antistatic layer was dissolved away. Under the sound and balance stripes the antistatic layer remained intact and both stripes appeared to be excellently attached to the polyethylene terephthalate film support as could be demonstrated according to the pressure-sensitive adhesive tape method.

We claim:

1. A process for the manufacture of a dimensionally stable polyester film support carrying a primer coating to be eventually covered in part by a subsequently applied coating and in part exposed uncovered, said primer coating being adapted to improve the adhesion thereto of said subsequently applied coating, while exhibiting desirable mechanical properties in the exposed areas thereof, which process comprises applying to an at most monoaxially stretched polyester film support a primer layer of a coating composition from an aqueous dispersion, drying said layer, stretching the coated support biaxially or in a direction perpendicular to the said first stretching operation together with the polyester film support and heat-setting the stretched, coated polyester film, wherein said coating composition, before drying and heat-setting, is a dispersion in water of a mixture consisting essentially of:

(A) 52 to 79% by weight of a copolymeric binder consisting essentially of 60 to 95% by weight of a methyl methacrylate, 3 to 20% by weight of a divinyl or diallyl monomer, 0 to 30% by weight of a plasticizing ethylenically unsaturated monomer, and 0 to 5% by weight of an ethylenically unsaturated carboxylic acid, (B) 0.5 to 3% by weight of a water-insoluble waxy material having a melting point in the range of about 20°-100° C. and selected from vegetable waxes, insect waxes, animal waxes, mineral waxes, petroleum waxes, synthetic waxes, and wax-like longchain hydrocarbons, fatty saturated and unbranched acids and alcohols, and ethers and esters of substantially aliphatic monohydric alcohols and/or of a water-insoluble polymer consisting of repeating units corresponding to the formula:

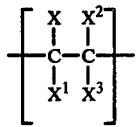

wherein each of $X$, $X^1$, $X^2$, and $X^3$ represents hydrogen or fluorine, or each of $X$, $X^1$, and $X^2$ represents hydrogen and $X^3$ represents a methyl group, or $X$ represents chlorine and each of $X^1$, $X^2$, and $X^3$ represents fluorine, (C) 20 to 40% by weight of an external plasticizer, said external plasticizer being wholly or almost entirely eliminated from the coating composition during the heat-setting and (D) 0 to 5% by weight of a hydrophilic polymer.

2. A process according to claim 1, wherein the dimensionally stable polyester film support is a film of polyethylene terephthalate.

3. A process according to claim 1, wherein the hydrophilic polymer is hydroxyethyl cellulose or polyvinyl alcohol.

4. A process according to claim 1, wherein the external plasticizer is resorcinol, glycerol, phthalic acid, maleic acid, malonic acid or 1,1,1-tri(hydroxymethyl)-propane.

5. A process according to claim 1, wherein the divinyl monomer in the copolymeric binder is ethylene dimethacrylate.

6. A process according to claim 1, wherein the plasticizing monomer in the copolymeric binder is n-butyl acrylate, butadiene, or vinylidene chloride.

7. A process according to claim 1, wherein the unsaturated acid in the copolymeric binder is itaconic acid or methacrylic acid.

8. A process according to claim 1, wherein the copolymeric binder is a copolymer of methyl methacrylate and ethylene dimethacrylate (90:10%), a copolymer of methyl methacrylate, ethylene dimethacrylate and n-butyl acrylate (80:10:10%), or a copolymer of methyl methacrylate, ethylene dimethacrylate, n-butyl acrylate and itaconic acid (77:10:10:3%).

9. A process according to claim 1, wherein ingredient B is polyethylene, polypropylene, polymonochlorotrifluoroethylene, or polytetrafluoroethylene.

10. A process according to claim 1, wherein (a) magnetic recording stripe(s) is or are applied from organic solvent solutions on the primer layer.

11. A process according to claim 10, wherein an intermediate layer constituting an antihalation layer or an antistatic layer, which is removable in alkaline solutions, is applied to the said primer coating after the stretching and heat-setting, and wherein the coating composition applied for forming the magnetic recording stripe(s) contains at least one bis- or polyfunctional compound which enters into reaction with the binder of said intermediate layer and cross-links it to insoluble state under the magnetic recording stripe(s).

12. A process according to claim 11, wherein the coating composition for forming the magnetic recording stripe(s) contains a mixture of N,N-bis(2,3-epoxypropyl)butylamine and dimethylsulphoxide.

13. A dimensionally stable polyester film support carrying a strongly adhered primer layer which is eventually in part covered by a subsequently applied layer and in part exposed uncovered, said layer having been applied to said support, while the latter is unstretched in at least one direction, from a dispersion in water of a mixture consisting essentially of:

(A) 52 to 79% by weight of a copolymeric binder consisting essentially of 60 to 95% by weight of a methyl methacrylate, 3 to 20% by weight of a divinyl or diallyl monomer, 0 to 30% by weight of a plasticizing ethylenically unsaturated monomer, and 0 to 5% by weight of an ethylenically unsaturated carboxylic acid, (B) 0.5 to 3% by weight of a water-insoluble waxy material having a melting point in the range of about 20°-100° C. and selected from vegetable waxes, insect waxes, animal waxes, mineral waxes, petroleum waxes, synthetic waxes, and wax-like longchain hydrocarbons, fatty saturated and unbranched acids and alcohols, and ethers and esters of substantially aliphatic monohydric alcohols and/or of a water-insoluble polymer consisting of repeating units corresponding to the formula:

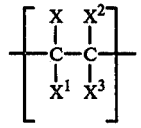

wherein each of $X$, $X^1$, $X^2$, and $X^3$ represents hydrogen or fluorine, or each of $X$, $X^1$, and $X^2$ represents hydrogen and $X^3$ represents a methyl group, or $X$ represents chlorine and each of $X^1$, $X^2$, and $X^3$ represents fluorine, (C) 20 to 40% by weight of an external plasticizer, said external plasticizer being at least substantially eliminated from the coating composition during the heat-setting, and (D) 0 to 5% by weight of a hydrophilic polymer, after the application of which layer said coated support is dried, stretched as necessary to impart biaxial stretching thereto, and heat set whereby said copolymeric binder is cured and said external plasticizer at least substantially eliminated from said layer.

14. A dimensionally stable polyester film support according to claim 13, wherein the dimensionally stable polyester film support is a film of polyethylene terephthalate.

15. A dimensionally stable polyester film support according to claim 13, wherein the hydrophilic polymer is hydroxyethyl cellulose or polyvinyl alcohol.

16. A dimensionally stable polyester film support according to claim 13, wherein the divinyl monomer in the copolymeric binder is ethylene dimethacrylate.

17. A dimensionally stable polyester film support according to claim 13, wherein the plasticizing monomer in the copolymeric binder is n-butyl acrylate, butadiene or vinylidene chloride.

18. A dimensionally stable polyester film support according to claim 13, wherein the unsaturated acid in the copolymeric binder is itaconic acid or methacrylic acid.

19. A dimensionally stable polyester film support according to claim 13, wherein the copolymeric binder is a copolymer of methyl methacrylate and ethylene dimethacrylate (90:10%), a copolymer of methyl methacrylate, ethylene dimethacrylate and n-butyl acrylate (80:10:10%) or a copolymer of methyl methacrylate, ethylene dimethacrylate, n-butyl acrylate and itaconic acid (77:10:10:3%).

20. A dimensionally stable polyester film support according to claim 13, wherein ingredient B is polyethylene, polypropylene, polymonochlorotrifluoroethylene or polytetrafluoroethylene.

21. A motion picture film material comprising a dimensionally stable polyester film support, a subbing layer, and one or more light-sensitive silver halide emulsion layers, and at the opposite side of said polyester film support a primer layer, a magnetic recording stripe, and optionally between said primer layer and said magnetic recording stripe an antihalation layer or antistatic layer that is removable in alkaline solutions, wherein said primer layer is a layer according to claim 13.

* * * * *

UNITED STATES PATENT OFFICE
CERTIFICATE OF CORRECTION

Patent No. 4,132,552  Dated January 2, 1979

Inventor(s) August J. Van Paesschen et al

It is certified that error appears in the above-identified patent and that said Letters Patent are hereby corrected as shown below:

In the Claims:

Column 14, line 26 (claim 13, line 2), -- to be -- should be inserted after "which is".

Signed and Sealed this

Twelfth Day of June 1979

[SEAL]

Attest:

RUTH C. MASON
Attesting Officer

DONALD W. BANNER
Commissioner of Patents and Trademarks